Aug. 19, 1952 S. EVANS 2,607,608
INDUSTRIAL TRUCK
Filed April 1, 1949 2 SHEETS—SHEET 1
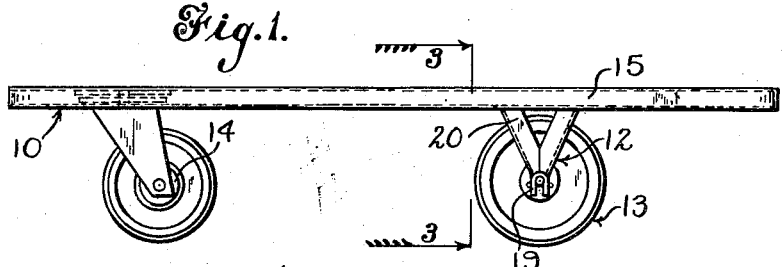
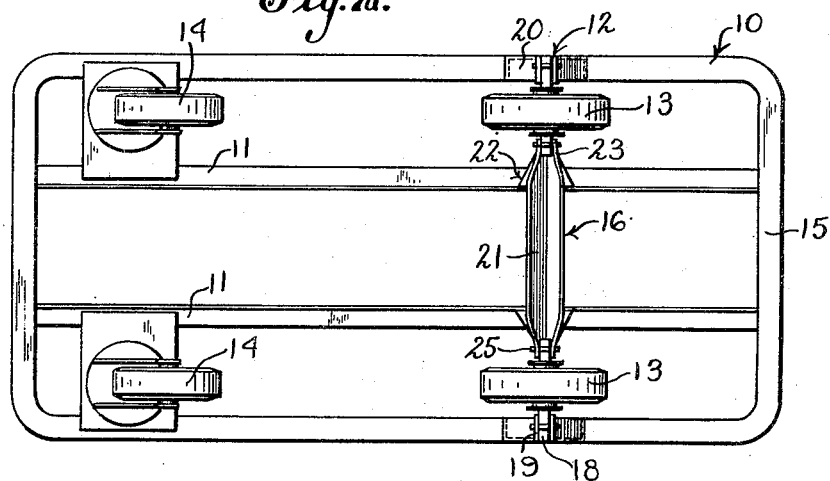
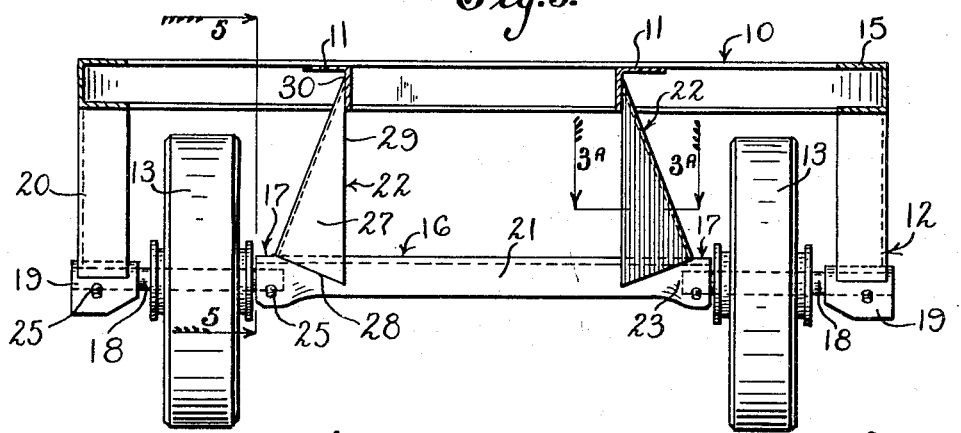
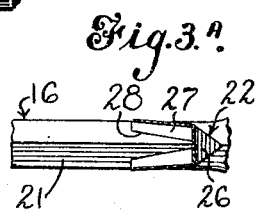
Inventor
Sanford Evans,
By Rockwell & Barkstone
ATTORNEYS Aug. 19, 1952   S. EVANS   2,607,608
INDUSTRIAL TRUCK
Filed April 1, 1949   2 SHEETS—SHEET 2
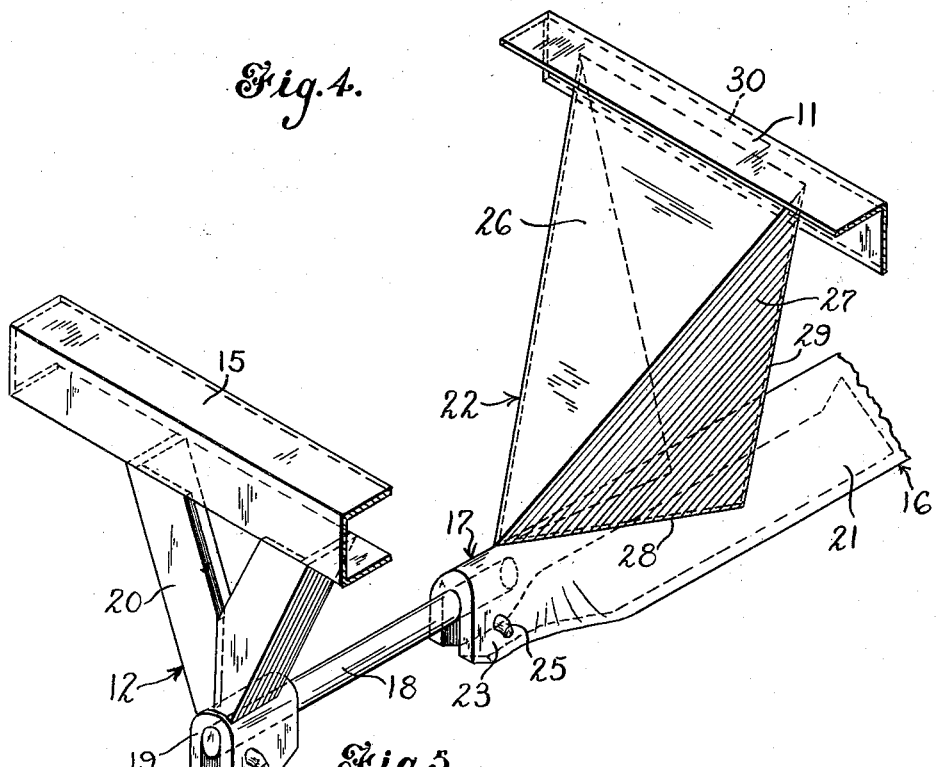
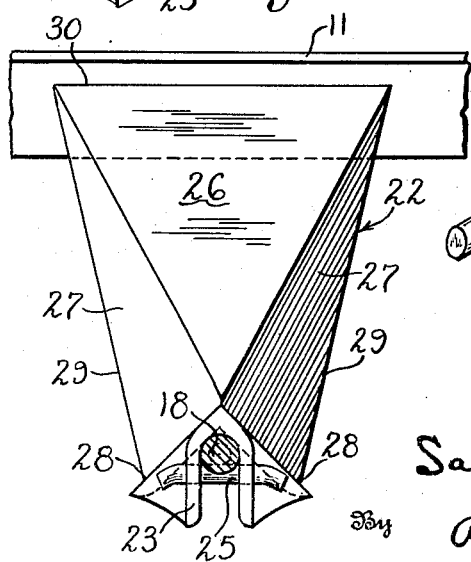
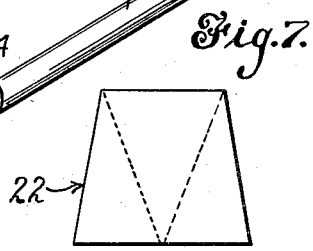
Inventor
Sanford Evans.
By Rockwell & Bartholow
ATTORNEYS Patented Aug. 19, 1952

2,607,608

UNITED STATES PATENT OFFICE 2,607,608

INDUSTRIAL TRUCK

Sanford Evans, Westport, Conn., assignor to The Bassick Company, Bridgeport, Conn., a corporation of Connecticut Application April 1, 1949, Serial No. 84,930

6 Claims. (Cl. 280—80)

This invention relates to industrial trucks, and more particularly to a fixed axle structure serving, for example, as the rear axle of the vehicle, and supporting a pair of revoluble wheels. The axle extends transversely of and is connected to a vehicle frame which usually comprises a number of longitudinal frame members.

An object of the invention is to provide an improved fixed axle structure for a vehicle of this type.

Another object is to provide a very strong construction which at the same time is inexpensive and easy to assemble.

Another object is to provide an improved form of axle support adapted to be interposed between an axle section and a longitudinal frame member of a truck.

Another object is to provide a composite axle structure adapted to carry a pair of revoluble wheels, which in use is adapted to take very heavy strains without damage, and which possesses also a number of other advantages.

In the accompanying drawings:

Fig. 1 is a side elevation of an industrial truck embodying my improvements;

Fig. 2 is a bottom plan view of the truck;

Fig. 3 is a section on line 3—3 of Fig. 1 on a larger scale;

Fig. 3A is a section on line 3A—3A of Fig. 3;

Fig. 4 is a fragmentary perspective view of a portion of the rear axle structure, the wheel being omitted;

Fig. 5 is a section on line 5—5 of Fig. 3;

Fig. 6 is a perspective view of one of the axle rods; and

Fig. 7 is a view of the blank used for the manufacture of a supporting member.

In the drawings, the invention is illustrated as applied to an industrial truck of a type commonly used, having a rectangular open frame provided with longitudinal members of angle bar form extending parallel to the side members of the frame. While the invention is not restricted to use in connection with a rear axle, the improvements are shown in connection with the rear axle, and the truck is equipped adjacent the forward end with swiveling casters of a known type. The rear axle structure is supported from the side members of the open vehicle frame, and from the parallel longitudinal reinforcing members. The illustrated rear-axle structure is a composite structure including, as hereinafter described, a main section supported and braced from the reinforcing longitudinal frame members, two end sections supported and braced from the respective side members of the vehicle frame, and interposed connecting members illustrated as short rods upon which the wheels are revoluble.

In the drawings, the vehicle frame is indicated generally at 10, the longitudinal reinforcing members at 11, the rear axle structure generally at 12, the rear wheels at 13, and the front casters at 14. The longitudinal reinforcing members 11 are illustrated as angle bars having horizontal top flanges and vertical side flanges. The side members 15 of the frame are illustrated as channel members having upper and lower flanges directed inwardly. The intermediate section of the axle structure 12 is indicated generally at 16, the end sections respectively at 17, and the wheel-supporting rods at 18. The section 16 is supported from the members 11, and the end sections are supported from the side members 15; and the rods 18, as hereinafter described, interconnect the intermediate or middle section with the end sections.

Each end section 17 comprises in this particular form a short piece of metal 19 bent to form a trough or channel, the channel being faced downwardly and adapted to receive a portion of the adjacent rod 18, as shown in Fig. 4. The member 19 is rigidly supported from the frame side member 15 in a suitable manner. In this particular case, the support 20 interposed between member 19 and the frame is a V-shaped support or bracket made of pieces of angle iron suitably cut and welded together, and welded to the member 19 and the frame member, the arrangement being such that member 19, which is spaced downwardly from the frame member, is strongly supported therefrom by a rigid depending support.

The intermediate section of the axle comprises a horizontal member 21 shown as an angle bar, supported from the longitudinal members 11 by supports 22. These supports are welded to the members 11 and to the member 21, and are arranged adjacent the respective ends of the member 21. The latter member adjacent its respective extremities is bent to bring the walls of the angle iron closely together and provide at the extremity a curved trough-like structure 23, which in section is similar to the member 19 and adapted to receive and hold an end of the rod 18. As shown in Fig. 6, the rod 18 is provided adjacent its respective ends with transverse annular grooves 24, and each rod is tightly held in place by being pinned to the adjacent members 19 and 21, by pins such as shown at 25, which engage the grooves 24 so as to prevent any endwise movement of the rod. The pins 25, after being inserted into perforations in the members 19 and 21 in a manner to hold the ends of the rod in their curved seats which conform to the rod ends, are bent or deformed at their ends, as shown in Fig. 5, so that they will be securely fastened in place.

The bar 21 in the main portion thereof has its walls, which are at 90° to each other, converging upwardly to a ridge, and each of the members 22 straddles the bar and at its lower edges is welded to the upper surfaces of the bar. The member 22 is a hollow member made of sheet metal having a triangular body 26, the larger end of which is uppermost, and having bent integral side walls or wings 27, the lower edges of which conform to the upper surface of the angle bar in a manner to cause member 22 to straddle the bar. The lower edges of the wings 27, which are welded to the bar, are indicated at 28, and the free side edges of the wings are indicated at 29, these latter edges lying in a substantially vertical plane and having their upper end portions welded to the adjacent face of the vertical flange of the corresponding member 11. The upper edge 30 of the triangular portion 26 is also welded to this flange. The supporting member extends downwardly from the member 11, with the triangular portion 26 sloped toward the end of the bar 21 and toward the adjacent wheel, as shown in Fig. 3, while the side edges of the wings 27 extend vertically. By this arrangement the bar 21 is strongly supported from the member 11 at a distance therefrom and in a region adjacent the end of the bar. The wing portions 27 provide walls which lie approximately at right angles to the plane of the triangular portion 26, and in the form shown the lower edges of the wings are arranged so that there is an angle of approximately 26° between them, although this angle may be changed as conditions may dictate.

In constructing the truck, the assembly of the wheels into the operative position may be effected conveniently after the middle bar 21 and the short end bars 19 have been secured to longitudinal members of the truck frame in the manner previously described. The truck body is placed or maintained in inverted position so that the rod-receiving channels of the members 19 and 21 project upwardly, and then each wheel is placed in position over a rod 18, the ends of the rod dropped into the channels or troughs, and the pins 25 placed in position. This makes for a very easy and convenient assembly of the structure.

The supporting member 22 may be very easily made by bending up a sheet metal blank, such as shown in Fig. 7, the bending lines being indicated by the dotted lines. It will be seen that the blank has parallel upper and lower edges of unequal length and side edges which converge in one direction. By bending up the side portions of the trapezoidal blank along the dotted lines until they are approximately perpendicular to the plane of the middle portion, reinforcing wings of the proper shape are provided.

It will be noted that the bar member 21 has a length noticeably greater than the horizontal distance between the vertical flanges of the member 11, and that the planar body portions of the members 22 extend on inclines to points quite near the extremities of member 21. The members 22 are of channeled cross section, having their channels facing each other. In the form shown, the channel of each member 22 has a depth of zero at the upper end, and increases progressively in depth to the lower end. The planar body portion 26, on the other hand, is of maximum width at the upper end and decreases in width progressively to the point where it meets the bar 21, where the width is zero.

In this construction the bar 21 is in the nature of a cantilever having support adjacent the ends from the members 22. The joint portions between the bodies of the members 22 and their wings are under compression between the vehicle frame and the bar 21, and the free edges 29 of the wings 27 are under tension, owing to their connection with the bar 21 and the bending force exerted on this bar.

The angular joint portions between the wings 27 and the body portions 26 are very strong and are disposed substantially coincidently with the lines of force transmitted between the vehicle frame and the axle. The members 22 serve to take up end thrust on the axle in a very satisfactory manner. Owing to the fact that the members 22 have their channels facing each other, end thrust from the respective opposite directions is strongly resisted. Owing also to the fact that the free edge portions of the wings are disposed inwardly, that is, toward the longitudinal axis of the vehicle, there is strong resistance toward downward bending of the middle portion of the bar 21.

It will be apparent from the foregoing that there is provided a very strong and rugged axle structure well adapted to give long service in heavy duty, and that in the construction the parts are of simple form and relatively few in number. It will also be apparent that in building the truck the involved operations, such as bending up the parts providing the rod-receiving channels, and welding the pieces together, can be easily performed, and do not require highly skilled labor or expensive equipment.

While the supports 22 are shown herein as having certain relative dimensions, the dimensions will vary as conditions may dictate, and while these supports are shown as composed of planar body and wing members, changes may be made in this and other respects.

Various modifications and changes in the organization of parts as well as in the details may be made without departing from the principles of the invention or the scope of the claims.

What I claim is:

1. In a structure such as described, a vehicle frame having longitudinal reinforcing bars at opposite sides of the longitudinal axis, an axle member below said bars having its ends continued laterally past the space between the bars, and supports of channeled cross section having their lower ends welded to said axle member and their upper ends welded to the respective reinforcing bars, the bottoms of the channels of said supports being inclined downwardly and outwardly toward the ends of said axle member, said axle member having a cross section of inverted V shape, and said supports being in straddling relation to said member, said supports each comprising a planar body portion and planar side walls or wings.

2. In a structure such as described, a vehicle frame having longitudinal reinforcing bars at opposite sides of the longitudinal axis, an axle member below said bars having its ends continued laterally past the space between the bars, and supports of channeled cross section having their lower ends welded to said axle member and their upper ends welded to the respective reinforcing bars, the bottoms of the channels of said supports being inclined downwardly and outwardly toward the ends of said axle member, said axle member having a cross section of inverted V shape, and said supports being in straddling relation to said member, said supports each comprising a planar body portion and planar side walls or wings, the planar body portion of each support being of triangular shape with the base of the triangle uppermost and the wings being of triangular shape with their bases lowermost.

3. In a vehicle such as described, a vehicle frame, an axle structure comprising an elongated middle section having an inverted V shape in cross section and short end sections, said sections being constituted by horizontal transverse members axially spaced apart but with their ends in alignment, supports depending from the frame and rigidly supporting said sections, each of said sections being separately supported from the frame, said middle section having supports of channeled cross section and the bottoms of the channels of said supports being inclined downwardly and outwardly toward the sides of the vehicle, the lower ends of said supports for the middle section being in straddling relation to said middle section, interposed connecting members of rod-like form set in between the end sections of the middle section, and wheels revoluble about said connecting members.

4. In a structure such as described, a vehicle frame, an axle member below said frame extending transversely thereof, said axle member having an inverted V shape in cross section, and supports of channeled cross section interposed between the frame and the axle member and welded thereto, the bottoms of the channels of said supports being inclined downwardly and outwardly toward the sides of the vehicle, and the lower ends of said supports being in straddling relation to said axle member.

5. In a vehicle such as described, the combination of a longitudinal frame bar having a side face, a transverse axle member below said bar having a cross section of inverted V shape, and a support of channeled cross section having its upper end welded to the side face of said bar, the bottom of the channel of said support being inclined in the direction of the length of the axle member, the bottom of said channeled support being provided by a planar triangular body having its base uppermost and the sides of said channeled support being provided by planar triangular wings having their bases lowermost, and said support being in straddling relation to said axle member and welded thereto.

6. In a vehicle such as described, a vehicle frame having longitudinal side bars and reinforcing longitudinal bars on opposite sides of the longitudinal axis of the frame, an axle structure extending transversely of the frame comprising three sections, said sections being short end sections of trough-like shape and a longer middle section of generally inverted V shape in cross section having trough-like ends, said sections being axially spaced apart but having their ends in horizontal alignment, supports depending from the frame and rigidly supporting said sections, each of said sections being separately supported from the frame, the middle section having supports of channeled cross section, and the bottoms of the channels of said supports being inclined downwardly and outwardly toward the sides of the vehicle, the lower ends of said supports being in straddling relation to said middle section adjacent its ends, the supports for the middle section being welded to the respective longitudinal reinforcing bars and the supports for the end sections being welded to the respective longitudinal side bars of the frame, interposed connecting members of rod-like form set in between the end sections and the middle section and fastened in the trough-like portions thereof, and wheels revoluble about said connecting members.

SANFORD EVANS.

REFERENCES CITED

The following references are of record in the file of this patent:

UNITED STATES PATENTS

| Number | Name | Date |
|---|---|---|
| 542,067 | Sellers et al. | July 2, 1895 |
| 717,752 | Koegel | Jan. 6, 1903 |
| 1,234,753 | Griswold | July 31, 1917 |
| 1,870,633 | Koehler | Aug. 9, 1932 |
| 1,888,451 | Chase | Nov. 22, 1932 |
| 2,077,543 | Barthel | Apr. 20, 1937 |
| 2,242,067 | Harris | May 13, 1941 |
| 2,307,149 | Milz et al. | Jan. 5, 1943 |
| 2,409,786 | Norton | Oct. 22, 1946 |
| 2,426,244 | Sitton | Aug. 26, 1947 |
| 2,463,323 | Sichman | Mar. 1, 1949 |